May 10, 1927.
E. O. SATHER
WINDSHIELD WIPER
Filed Feb. 2, 1925
1,628,198
3 Sheets-Sheet 1
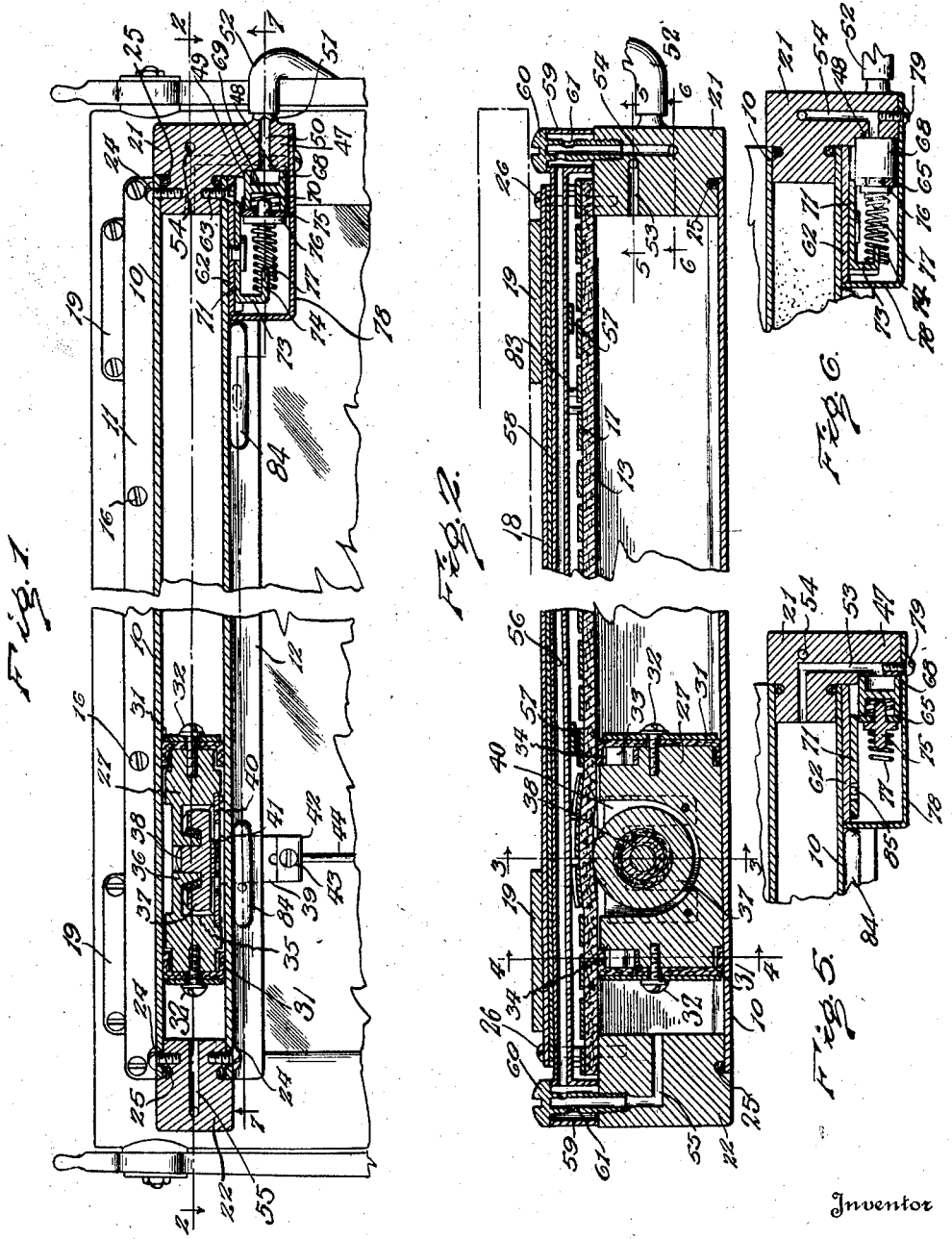
Inventor
E. O. Sather
By Lacey & Lacey, Attorneys

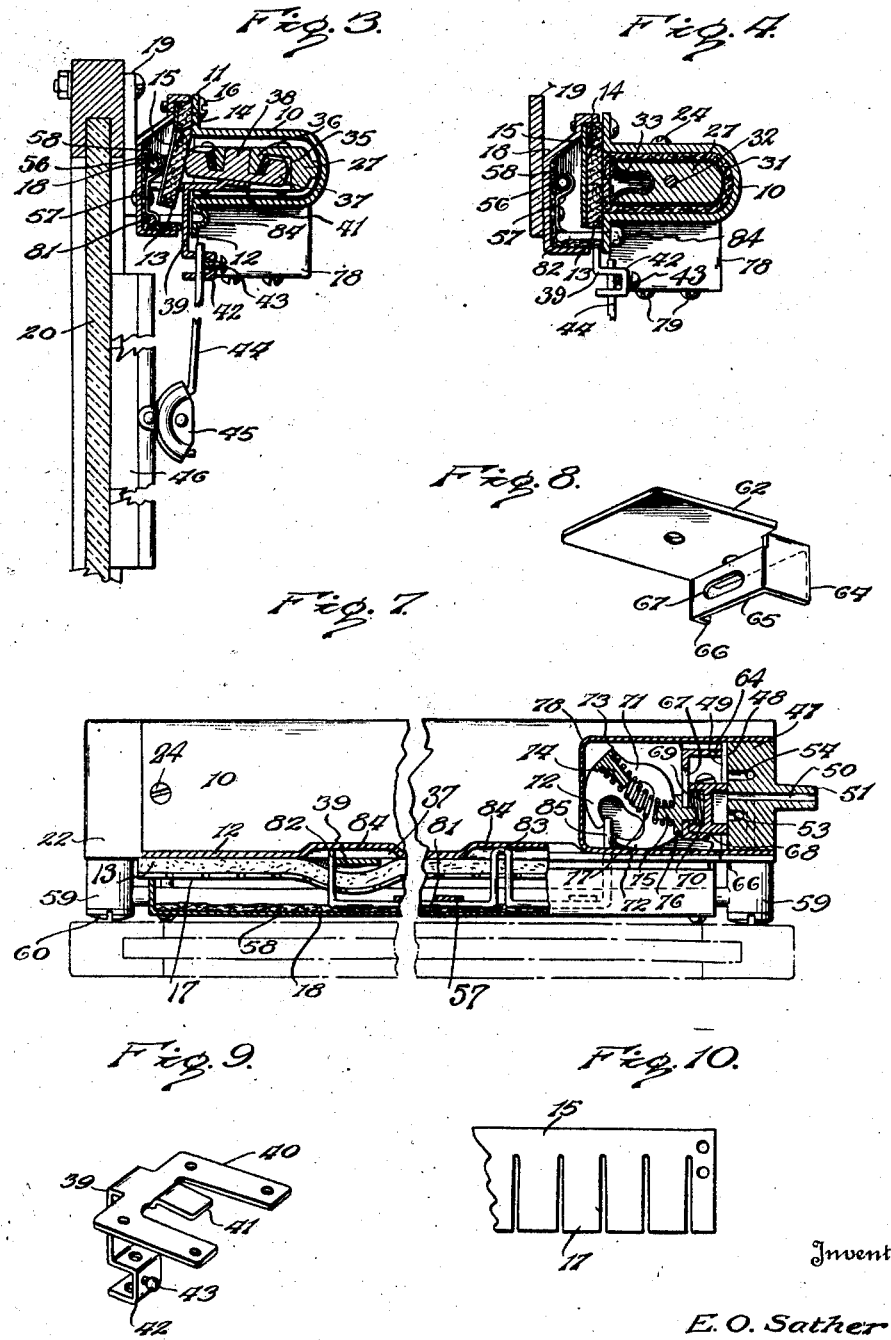

May 10, 1927.
E. O. SATHER
WINDSHIELD WIPER
Filed Feb. 2, 1925
1,628,198
3 Sheets-Sheet 3
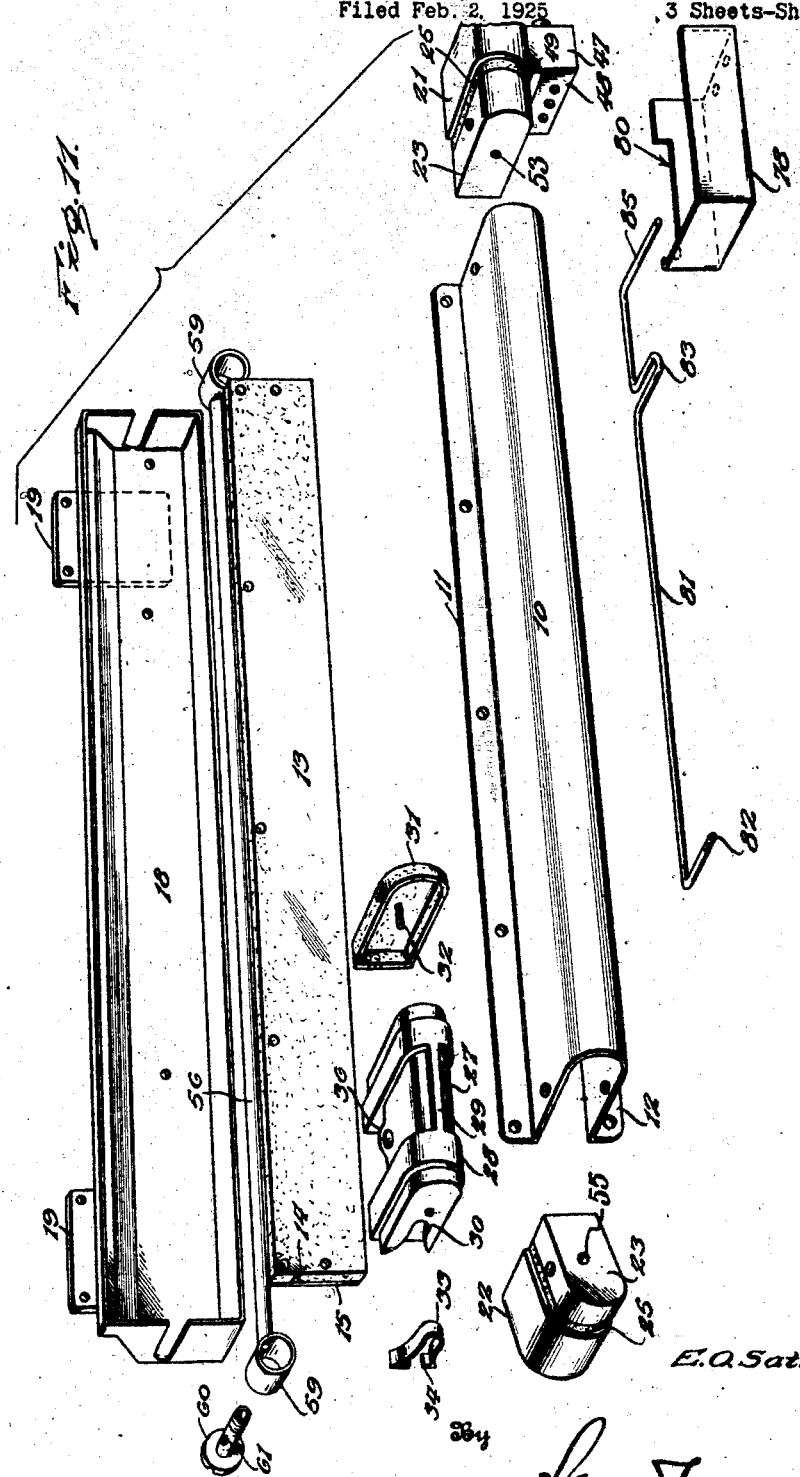
Inventor
E. O. Sather
By Lacey Lacey, Attorneys Patented May 10, 1927.

1,628,198

UNITED STATES PATENT OFFICE.

EDMUND O. SATHER, OF OAKLAND, CALIFORNIA.

WINDSHIELD WIPER.

Application filed February 2, 1925. Serial No. 6,401.

This invention relates to an improved windshield wiper, although the invention is applicable to other uses, and seeks, among other objects, to provide a dependable automatic device of this character operable by engine suction for cleaning the surface of the windshield.

The invention seeks, as a further object, to provide a device embodying a reciprocating squeegee as contradistinguished from a swinging squeegee as prevalently employed, and wherein continuous motion will be imparted to the squeegee throughout the interval that engine suction is communicated to the device.

A further object of the invention is to provide a novel cylinder structure as well as a novel piston structure and assembly of parts whereby the device may be economically produced.

Another object of the invention is to provide a novel valve structure and associated trip mechanism for automatically reversing the travel of the piston.

And the invention seeks, as a still further object, to provide a device which, in use, will serve to clean the windshield glass throughout the major portion of the windshield so that the driver may enjoy clear and unrestricted vision through the windshield.

Other and incidental objects will appear hereinafter.

In the accompanying drawings:

Figure 1 is a vertical longitudinal sectional view through the improved wiper, the device being shown applied to a conventional windshield.

Figure 2 is a horizontal sectional view on the line 2—2 of Figure 1, looking in the direction indicated by the arrows.

Figure 3 is a transverse sectional view on the line 3—3 of Figure 2, looking in the direction indicated by the arrows, this view particularly showing the shape of the cylinder employed.

Figure 4 is a transverse sectional view on the line 4—4 of Figure 2, looking in the direction indicated by the arrows, this view particularly showing one of the springs used in connection with the packing washers of the piston.

Figure 5 is a detail sectional view on the line 5—5 of Figure 2, looking in the direction indicated by the arrows.

Figure 6 is a detail sectional view on the line 6—6 of Figure 2, looking in the direction indicated by the arrows.

Figure 7 is a horizontal sectional view on the line 7—7 of Figure 1, looking in the direction indicated by the arrows, this view particularly showing the valve mechanism and associated parts.

Figure 8 is a detail perspective view of the valve retaining plate.

Figure 9 is a detail perspective view of the bracket arm employed.

Figure 10 is a fragmentary elevation showing the backing spring of the cylinder flap employed.

Figure 11 is a perspective view showing certain of the parts of the device disassembled but in proper relative position.

In carrying the invention into effect, I employ a flat channel-shaped cylinder 10 having parallel top and bottom walls joined by a curved connecting wall at one side of the cylinder while, at its opposite side, the cylinder is open, and projecting from the walls of the cylinder at the open side thereof are oppositely directed flanges 11 and 12 extending from end to end of the cylinder. Overlying the flange 11 is a flap 13 extending across the open side of the cylinder to bear against the flange 12, and formed in the outer side of the flap near the upper edge thereof, is a groove 14 extending from end to end of the flap and weakening the flap at the said groove so that the lower portion of the flap may readily flex with respect to the upper margin thereof. The flap is preferably formed of leather or other suitable material and overlying the flap is a flat backing spring 15 of a width equal to that of the flap. The spring also extends from end to end of the flap, and inserted through the flange 11 of the cylinder 10, through the flap and through said spring, are spaced screws 16 securing the parts in position. As shown in detail in Figure 10, the spring 15 is slotted transversely and is thus formed at its lower margin with a series of spaced tongues 17 overlying the lower margin of the flap. Abutting the upper margin of the backing spring is a housing 18 overlying the spring as well as the flap and, as particularly shown in Figure 3, the screws 16 are engaged through the housing so that the screws thus also serve to secure the housing in place as well as clamp the backing spring and flap between the housing and the flange 11 of the cylinder 10. The housing is formed to freely accommodate the flap and spring and serves to enclose and protect these parts. Fixed to the back wall of the housing near its ends are upstanding attaching plates 19 which are apertured to accommodate bolts or other suitable fastening devices for securing the device upon the front side of a windshield, conventionally illustrated at 20.

Closing the cylinder 10 at its ends are heads 21 and 22 which are provided, as best shown in Figure 11, with reduced portions 23 fitting in the cylinder, and extending through the top and bottom walls of the cylinder are screws 24 screwed into said reduced portions for securing the heads in position. At the base ends of the reduced portions 23 the heads are provided with channels in which are seated gaskets 25 cooperating with the ends of the cylinder 10 to form closed joints between the heads and the cylinder and, as brought out in Figure 2, the ends of the flap 13 overlie the rear edges of the heads and are held thereagainst by the backing spring 15 so that closed joints are thus provided between the flap and the heads. Extending through the back wall of the housing 18 near the ends thereof are, as also particularly shown in Figure 2, screws 26 which are threaded into the heads for anchoring the housing to the heads.

Slidable in the cylinder 10 is a piston 27 provided near its ends, as particularly shown in Figure 11, with encircling bands or ribs 28 as well as at its forward edge with a longitudinal rib 29 to coact with the walls of the cylinder. Formed in the ends of the piston are recesses 30 and fitting over said ends, to abut the ribs 28, are cup-shaped packing washers 31 detachably connected to the piston by screws 32. Fitting in the recesses 30 are substantially U-shaped tensioning springs 33 provided at their ends with approaching lugs 34 which, as shown in Figure 4, lie flat against the rear walls of the washers 31, for holding said walls flat against the flap 13 of the cylinder, and bear within the angles at the ends of said walls for supporting the rear corners of the washers to fit within the angles defined between said flap and the walls of the cylinder so that the washers, notwithstanding the shape thereof, will be caused to always form a sealed joint with the walls of the cylinder and said flap. Formed in the piston from the lower side thereof is, as clearly shown in Figures 1, 2 and 3 of the drawings, a recess 35 across a portion of which extends a web having a bearing 36, and freely received in said recess is a roller 37 provided at one side thereof with an upstanding axial stud 38 journaled in said bearing. As will be observed in Figure 3, the roller is tilted to occupy an oblique position with respect to the upper and lower sides of the piston and is of a diameter to project beyond the plane of the flanges 11 and 12 of the cylinder into engagement with the flap 13 and, as shown in Figure 3, serves to press or bulge the lower margin of the flap outwardly against the tension of the tongues 17 of the backing spring 15 away from the flange 12 of the cylinder. Extending downwardly from the piston externally of the cylinder freely through the bulge produced in the flap 13 is a bracket arm 39 provided at its upper end with a yoke 40 straddling the recess 35 in the piston. The yoke is countersunk in the lower side of the piston, to which it is suitably fixed, and projecting between the sides of the yoke is a medially disposed tongue 41 bearing flat against the lower side of the roller 37 for supporting the roller and retaining the stud 38 thereof in the bearing 36. As shown in Figure 3, the arm 39 extends in close spaced relation to the flange 12 of the cylinder, parallel thereto, and is provided at its lower end with a yoke 42 mounting a set screw 43. The yoke 42 is apertured to slidably receive a rod 44 which is adjustably secured to the yoke by the set screw 43 and mounted upon the lower end of the rod is a plate 45 to which is pivoted a suitable squeegee 46 supported by the arm to bear against the windshield 20. It is now to be noted that as the piston 27 is reciprocated, the roller 37 will, in traveling along the flap 13, cause the bulge in the flap produced by the roller to also travel along the flap with the movement of the piston so that the arm 39 will always be freely accommodated by said bulge. Provision is thus made, without specially slotting or aperturing the cylinder, for the free movement of the arm with the piston while, at the same time, the flap 13 is maintained by the backing spring 15 in flat contact with the flange 12 of the cylinder at opposite ends of the piston for sealing the cylinder at and adjacent the packing washers 31 of the piston.

Depending from the head 21 of the cylinder 10 is an angularly disposed portion or extension block 47 cut away at its inner side to provide a flat face 48 at the upper edge of which is a shoulder 49, and formed through the block is, as shown in Figure 1, a passage 50 at the outer end of which is a nipple 51 to receive a hose or pipe 52 communicating with the intake manifold of the vehicle engine (not shown) or otherwise connected with the engine so that engine suction will operate through said pipe. Opening at one end through the flat face 48 of the block, at one side of the passage 50 is, as shown in Figures 5 and 7, a passage 53, the opposite end of which opens through the inner end of the head 21 to communicate with the adjacent end of the cylinder 10. Opening through the face 48 of the block at the opposite side of the passage 50 is, as shown in detail in Figures 6 and 7, a passage 54, the opposite end of which, as shown in Figure 2, opens through the rear face of the head. The head 22 of the cylinder is, as also shown in Figure 2, likewise provided with passage 55, one end of which opens into the adjacent end of the cylinder 10 while the opposite end of said passage opens through the rear face of said head and communicates with the passage 54 through a tube 56 lying within the housing 18. Secured to the back wall of the housing are, as shown in Figure 3, spaced double-ended clips 57, the upper ends of which bear over the tube 56 for connecting the tube with the housing, and extending beneath the clips to overlie the back wall of the housing is a pad 58, the upper margin of which is disposed between the cross tube and said wall to obviate chafing or rattling. Formed on the tube 56, at its ends, are, as shown in Figure 2, angularly disposed sleeves 59, and extending freely through said sleeves are tubular cap screws 60 screwed into the adjacent ends of the passages 54 and 55 and communicating therewith. The forward ends of the sleeves are thus tightly clamped against the rear faces of the cylinder heads 21 and 22 while the rear ends of the sleeves are closed by the heads of said screws, and formed in the screws are openings 61 establishing communication between the passages 54 and 55 and the tube 56.

Lying flat against the bottom wall of the cylinder 10 to abut the block 47 of the head 21 is, as shown in Figure 1, a plate 62 secured at one end to the head by a screw 63 extending through said wall of the cylinder. This plate is shown in detail in Figure 8 and, as will be observed, is formed at one end with a depending lug 64 bent down from the adjacent side edge of the plate and provided with a tongue 65 in turn bent near its free end to form a lug 66 disposed parallel to the lug 64. The tongue 65 projects from the inner vertical edge of the lug 64 and is spaced from the base end of said lug so that, as will be seen, the tongue is disposed in spaced relation below the plate 62 to extend transversely with respect to the adjacent end thereof in parallel relation to the flat face 48 of the block 47. Formed in the tongue is a longitudinally extending slot 67 and slidably fitting between the tongue and said face of the block is a hollow cylindrical valve 68 resting at one end flat against the face 48. The valve is formed with a partition 69 defining a socket at the opposite end of the valve and freely accommodated in said socket is a spring 70 coacting between the tongue 65 and said partition for pressing the valve against said face 48 to form a sealed joint therewith. Pivoted upon the plate 62 in the rear of the tongue 65 is a substantially semi-circular rocker 71 notched to define spaced confronting horns 72 (see Figure 7) and depending from the rocker is an angle-shaped plate 73 terminating in a stud 74 lying in spaced parallel relation to the rocker to project toward the tongue 65. Coacting with the tongue 65 is a double-ended slide member 75 having a medial flange 76 to bear against the outer side of the tongue, the inner end of said member projecting freely through the slot 67 of the tongue into the adjacent end of the valve 68. Fitting at one end over the outer end of the slide member and at its opposite end over the stud 74, is a spring 77 pressing the slide member against the tongue. Fitting the block 47 of the head 21 is a casing 78 abutting the bottom wall of the cylinder 10 to enclose the valve, rocker, and associated parts, and, as shown in Figures 5 and 6, said casing is detachably connected at its adjacent end with said block by screws 79. The valve 68 is thus confined between the bottom wall of the casing and the shoulder 49 of the block, and formed in the rear side wall of the casing is, as shown in Figure 11, a longitudinal notch 80.

As best shown in Figues 3 and 4, the bottom wall of the housing 18 lies in spaced relation to the flange 12 of the casing 10 so that the arm 39 may freely travel back and forth between said wall and flange. However, in order to exclude the weather as well as dust and dirt, the pad 58 is extended downwardly to overlie the bottom wall of the housing and projects therefrom toward the flange 12 for partially closing the slot between the wall and flange, and resting upon the lower portion of the pad is a trip rod 81 slidably retained by the lower ends of the clips 57 which engage over the rod. Formed on the rod at one end thereof is a laterally directed leg 82 while near its opposite end the rod is looped to provide a like leg 83. These legs project toward the flange 12 and pressed from said flange are, as shown in Figure 7, channels 84 slidably accommodating the free ends of the legs. These legs thus extend at opposite sides of the arm 39 which is carried by the piston 27, and formed on the rod 81 at its forward end is an arm 85 which, as also shown in Figure 7, projects freely through the notch 80 of the casing 78 between the horns 72 of the rocker 71 to coact therewith.

As will now be seen in view of the foregoing, when the valve 68 is in the position shown in Figure 7, the valve will connect the passages 50 and 53 so that engine suction will be communicated to the adjacent end of the cylinder 10 and the piston 37 drawn toward said end which is to the right in the drawings. As the piston reaches the end of its travel in this direction, the arm 39 thereof will strike the leg 83 of the trip rod 81 and shift said rod endwise toward the right, so that the arm 85 of the rod will be caused to swing the rocker 71 so that the angle plate 73 and lug 74 will be moved from the position illustrated in Figure 7 at the forward side of the slide 75, to occupy a corresponding position at the rear of the slide. Thus, as the rocker reaches the end of its throw, the spring 77 will tend to shift the slide forwardly along the tongue 65 and at the instant when the sidewise thrust of the spring on the slide becomes sufficient, the slide will be quickly snapped from the position at the rear end of the slot 67 to a position at the forward end of said slot. Since the inner end of the slide is smaller in diameter than the valve, the slide will travel a corresponding distance independently of the valve, with the result that the inner end of the slide will strike the wall of the valve with some force. The blow on the valve will not only tend to set the valve into motion but will also tend to tip the valve so that the seal between the valve and the flat face 48 of the block 47 will be broken and the valve shifted by the slide forwardly along said face. Forward movement of the valve will, of course, be limited by the lug 64 so that the valve, when in its forward position, will span the inner ends of the passages 50 and 54. Thus, engine suction will be communicated to the left hand end of the cylinder 10, with the result that the piston will be shifted to the left. As the piston reaches the end of its throw, the arm 39 will strike the leg 82 of the trip rod 81 and shift said rod to the left, as seen in Figure 7, with the result that the rocker 71 will be returned to the position shown in this figure of the drawings. The thrust of the spring 77 will then immediately function to shift the slide 75 rearwardly to the position shown and return the valve rearwardly to engage the lug 66. The slide 75 will, of course, thus again be caused to strike the valve for tipping and quickly shifting the valve and, as will be seen, the mechanism will function to reverse the movement of the piston at the end of its travel in each direction as long as engine suction is communicated through the pipe 52.

Having thus described the invention, what I claim is:

1. In a wiper mechanism, a cylinder having a flexible wall, a suction operated piston reciprocable in the cylinder, means carried by the piston to form a bulge in said wall traveling along the wall with the piston, an arm carried by the piston and extending from said cylinder through said bulge, a wiping element carried by said arm, and means for automatically reversing the travel of the piston.

2. In a wiper mechanism, a cylinder, a flap closing the cylinder, a suction operated piston reciprocable in the cylinder, means carried by the piston flexing said flap to form a bulge therein traveling along the flap with the piston, an arm carried by the piston extending from the cylinder through said bulge, a wiping element carried by said arm, and means for automatically reversing the travel of the piston.

3. In a wiper mechanism, a cylinder, a flap closing the cylinder, a suction operated piston reciprocable in the cylinder, means carried by the piston flexing said flap to form a bulge therein traveling along the flap with the piston, an arm carried by the piston extending from the cylinder through said bulge, a wiping element carried by said arm, means for automatically reversing the travel of the piston, and a backing spring overlying said flap normally holding the flap closed.

4. In a wiper mechanism, a cylinder, a flap closing the cylinder, a suction operated piston reciprocable in the cylinder, a roller carried by the piston flexing said flap to form a bulge therein traveling along the flap with the piston, an arm carried by the piston extending from the cylinder through said bulge, a wiping element carried by said arm, and means for automatically reversing the travel of the piston.

5. In a wiper mechanism, a cylinder, a suction operated piston reciprocable therein and provided with a recess, a flap normally closing the cylinder, a roller journaled in said recess and flexing the flap to form a bulge therein traveling along the flap with the piston, an arm fixed to the piston to extend from the cylinder through said bulge and provided with a tongue sustaining the roller in said recess, a wiping element carried by said arm, and means for automatically reversing the travel of the piston.

6. In a wiper mechanism, a flat channel-shaped cylinder open at one side, a spring pressed flap normally closing the open side of the cylinder, a suction operated piston reciprocable in the cylinder, end washers carried by the piston, springs on the piston pressing said washers to fit in the angles between said flap and the adjacent walls of the cylinder, means carried by the piston flexing said flap to form a bulge therein traveling along the flap with the piston, an arm carried by the piston and extending from the cylinder through said bulge, a wiping element carried by said arm, and means for automatically reversing the travel of the piston.

7. In a wiper mechanism, a cylinder, heads closing the ends of the cylinder and provided with passages, a cross tube provided at its ends with sleeves abutting the heads, tubular fastening devices extending freely through said sleeves and screwed into said passages to communicate therewith, said fastening devices being provided with openings establishing communication between the passages through the sleeves and said cross tube, a suction operated piston reciprocable in the cylinder, a valve associated with one of the heads for alternately connecting the ends of the cylinder through said passages with a source of suction, and means operable by the piston for actuating said valve.

8. In a wiper mechanism, a cylinder, a suction operated piston reciprocable therein, a wiper element suspended on the piston, a single transversely slidable valve mounted at one end of the cylinder below the path of the piston, means including a rocker mounted on the cylinder above the valve for snapping the valve in opposite directions to alternately connect the ends of the cylinder with a source of suction, and means coacting with the rocker operable by the piston for actuating the rocker.

9. In a wiper mechanism, a cylinder, a suction operated piston reciprocable therein, a single valve slidably mounted transversely at one end of the cylinder below the path of the piston, a slide engaged directly with the valve for shifting the valve in opposite directions to alternately connect the ends of the cylinder with a source of suction, a rocker mounted on the under side of the cylinder above the valve, a spring bearing between and connecting the rocker and the slide, and means operable by the piston coacting with the rocker for actuating the rocker and the spring to shift the slide in opposite directions.

10. In a wiper mechanism, a cylinder, a suction operated piston reciprocable therein, a single valve slidably mounted transversely at one end of the cylinder below the path of the piston, a slide having a lost-motion connection directly with the valve and shiftable to move the valve in opposite directions to alternately connect opposite ends of the cylinder with a source of suction, means for shifting the slide, and means operable by the piston for actuating said shifting means.

11. In a wiper mechanism, a cylinder, heads closing the ends of the cylinder, a suction operated piston reciprocable in the cylinder, a wiper element rigidly suspended on the piston, passages in the heads opening into the cylinder, a source of suction common to said passages, a single transversely slidable valve associated with one of the heads below the cylinder for alternately connecting the ends of the cylinder through said passages with the source of suction, and means operable by the piston for actuating the valve.

12. In a wiper mechanism, a cylinder, heads closing the ends of the cylinder, one of said heads being provided with an extension block below the cylinder, a suction operated piston reciprocable in the cylinder, a wiper element rigidly suspended from the piston, the heads being formed with passages opening into the ends of the cylinder and leading therefrom into said block, means for connecting the block with a source of suction, a single transverse valve slidable against said block below the cylinder and movable in opposite directions for alternately connecting the ends of said passages with the source of suction, and means operable by the piston for actuating said valve.

13. In a wiper mechanism, a cylinder, a suction operated piston reciprocable therein, a wiper element suspended on the piston, a single transversely slidable valve mounted below the cylinder at one end thereof to connect the opposite ends of the cylinder alternately with a source of suction, a slide mounted immediately adjacent the valve and having one end engaged directly therewith, a rocker mounted adjacent the slide, a spring connecting the rocker with the slide, a trip rod engaged at one end with the rocker, and means whereby travel of the piston and the wiper element will actuate said rod.

14. In a wiper mechanism, a cylinder, a suction operated piston reciprocable therein, a wiper element suspended on the piston, a single transversely slidable valve mounted below the cylinder at one end thereof to connect opposite ends of the cylinder alternately with a source of suction, a slide mounted immediately adjacent the valve and having one end engaged directly therewith, a rocker mounted adjacent the slide, a spring connecting the rocker with the slide, and a trip rod slidable along the cylinder and provided at one end with a lateral arm engaged with the rocker and having spaced arms at opposite sides of the wiper element to be engaged alternately by said element whereby travel of the piston and the wiper element will actuate the rod and the rocker.

15. In a wiper mechanism, a cylinder, heads closing the ends of the cylinder, one head having an extension below the cylinder and there being passages in the heads and in said extension communicating with the cylinder and a source of suction respectively, a suction operated piston in the cylinder, a wiper element carried by the piston, a hollow valve slidable below the cylinder and against said extension whereby to connect opposite ends of the cylinder alternately with the source of suction, yieldable means holding the valve against the extension to seal the passages therein, a slide having one end playing in the valve to impinge against the wall thereof and tilt the valve to break the seal, and means controlled by the piston and the wiper element to shift the slide and the valve.

16. In a wiper mechanism, a cylinder, a suction operated piston reciprocable therein, a wiper element suspended on the piston, a single transverse slidable valve below the cylinder at one end thereof to connect the opposite ends of the cylinder alternately with a source of suction, a guide adjacent the valve, a slide mounted in said guide and engaged at one end in the valve, a rocker mounted adjacent the slide, a stud on the rocker, a spring engaged at one end upon said stud and at its opposite end on the free end of the slide, and means controlled by the piston and the wiper element for actuating the rocker.

In testimony whereof I affix my signature.

EDMUND O. SATHER. [L. S.]